Sept. 7, 1948.  G. W. CRISE  2,448,776
THERMOSTATIC CONTROL AND SIGNALING DEVICE
Filed Jan. 19, 1944  2 Sheets-Sheet 1

Inventor
George W. Crise
By  [signature]
Attorney

Sept. 7, 1948.   G. W. CRISE   2,448,776
THERMOSTATIC CONTROL AND SIGNALING DEVICE
Filed Jan. 19, 1944   2 Sheets-Sheet 2
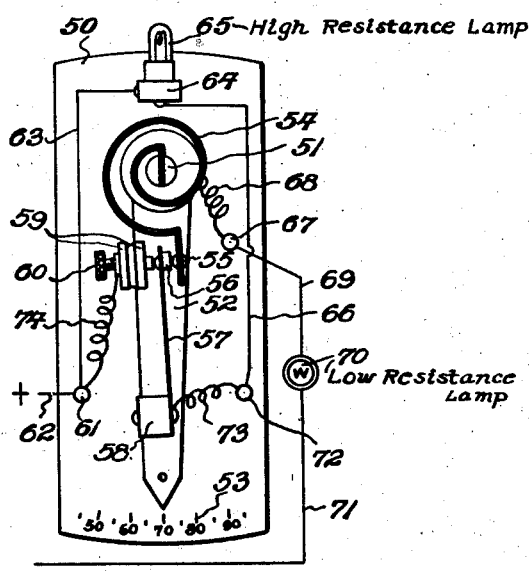
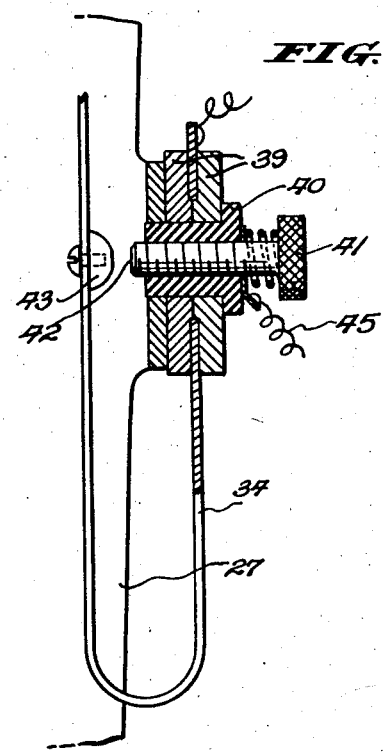
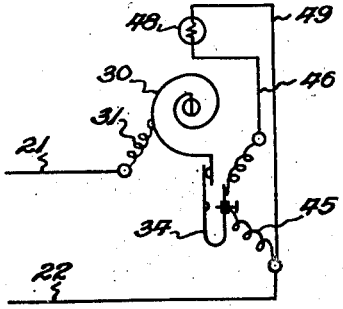
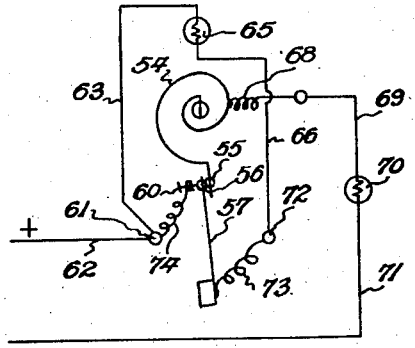
Inventor
George W. Crise
By N. S. McDowell
Attorney Patented Sept. 7, 1948

2,448,776

UNITED STATES PATENT OFFICE 2,448,776

THERMOSTATIC CONTROL AND SIGNALING DEVICE

George W. Crise, Columbus, Ohio

Application January 19, 1944, Serial No. 518,857

4 Claims. (Cl. 177—311)

This invention relates to thermostats of the type employed in regulating the operation of heating or air-conditioning systems, and the general object of the invention is to provide, in connection with such thermostats, a visual or audible signal which is adapted to be energized, or to otherwise actively function, when a critical condition prevails in the associated heating or air-conditioning apparatus.

An outstanding problem encountered in heating systems equipped with automatic controls is that of when to refuel or otherwise attend the fuel bed, and while this is particularly true of hand-fired furnaces, it applies also to stoker-fed systems which necessitate the removal of clinkers and ashes and the refilling of the stoker hopper with coal.

In accordance with the present invention, I minimize this problem by the use of a novel signal of an electrically energized type which operates in conjunction with a temperature regulating thermostat, so that whenever the room temperature falls below a predetermined thermostatic setting, the signal is energized to warn the occupants of a house of the attention-requiring furnace condition.

In the past, some use has been made of a signal on a room thermostat for the purpose of indicating whether the draft door of an associated furnace was open, or that the stoker, oil or gas burner was functioning with its controls in an operating position. This information is, however, relatively unimportant, since it is the normal function of automatic controls to open the draft or effect a forced supply of fuel to the associated furnace or heater. However, it is important to know if the heating system needs personal attention or has otherwise become inoperative so that the fire may go out completely and require rebuilding, or, in the case of stokers, whether coal has fouled the feed screw, or if poor combustion has caused the fire in the fire bowl to go out, since under these conditions, prolonged operation of the stoker may fill the furnace with unburned coal and even break castings. In the case of an oil fire, clogging of the fuel nozzle and exhaustion of the oil supply are common conditions often encountered. In all these cases, it is important to know at the earliest possible moment whether any of these contingencies have happened so that they may be corrected with the least trouble and before the house has become chilled.

Another important advantage of my system over signals that are energized each time the damper opens, or the stoker or oil burner starts, lies in the fact that a signal which is frequently turned off and on receives little attention, because of the repetitious nature of the control, whereas, in accordance with the present invention, my improved signal operates infrequently and invariably represents a cause for concern, requiring prompt correction of the condition indicated.

For a further understanding of the invention, reference is to be had to the following description and to the accompanying drawing, wherein:

Fig. 4 is a front elevational view of a still further modified form of my improved thermostatic switch;

Fig. 5 is an enlarged detail sectional view taken through the switch spring of the switch disclosed in Fig. 1 and the mounting therefor;

Fig. 6 is a wiring diagram of the electrical circuits involved in the use of the switch disclosed in Fig. 1;

Fig. 7 is a similar view of the electrical circuits employed in the switch structure of Fig. 4.

Figure 1:
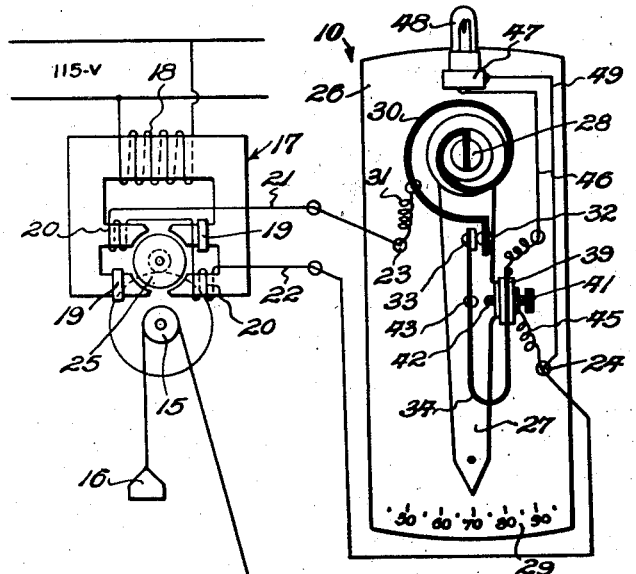
Fig. 1 is a diagrammatic view of a furnace-controlling thermostat and associated draft-operating controls, wherein the thermostat is provided with a visual warning signal operated in accordance with the present invention.
Figure 2:
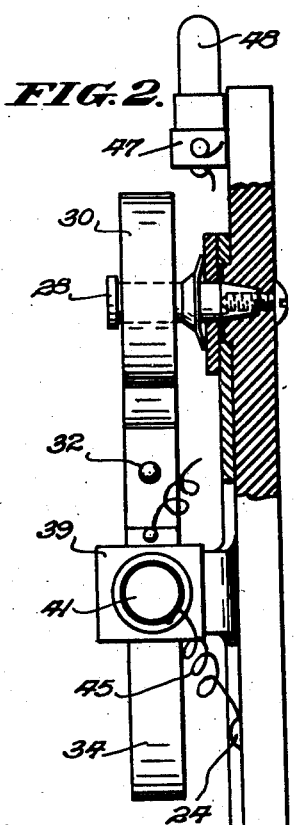
Fig. 2 is a side elevational view, partly in vertical section, of the thermostatic switch disclosed in Fig. 1.

Referring more particularly to the drawing, the numeral 10 designates a furnace-controlling thermostat of the wall-mounted room type. An associated remotely disposed furnace is indicated at 11, the latter being shown as provided with a draft door 12 which is adapted to be raised and lowered by a cable 13 extending over a guide 14 and around a motor-operated drum 15, the upper end of the cable being provided with a counter-balancing weight 16. Used in operating the drum 15 is a shaded pole motor 17 of the type disclosed in my prior patent, No. 2,134,685. While I may use other types of furnace control actuators, such as relays, solenoids and the like, the shaded pole motor here disclosed has been found to be particularly useful when employed in conjunction with my improved signalling mechanism, as will be hereinafter more fully set forth.

The motor 17 has a primary coil 18, which is adapted to be energized by being connected to any suitable source of alternating current. The numeral 19 designates fixed counter-clockwise shading coils, and the numeral 20 wound clockwise shading coils which are adapted to be connected through leads 21 and 22 to terminal screws 23 and 24 of the thermostat 10.

It will be noted that the fixed shading coils 19 may possess sufficient current capacity to cause a partial phase splitting, thereby causing the armature 25 to rotate by the conventional shading coil method. The wound shading coils are of larger capacity, at least sufficient to overpower the effect of the fixed coils 19 and cause reverse phase splitting with consequent motor reversal when the circuit of said wound coils is closed by the action of the thermostat 10.

It will be clear from the drawing that when the circuit through the thermostat is open, the circuit for said wound shading coils is interrupted, thereby rendering the same inoperative and the direction of rotation of the motor will be determined by the action of the fixed shading coils in the usual manner, and that when the circuit through the thermostat is closed, the relatively larger capacity of the wound shading coils 20 will become operative, causing the motor to rotate in the opposite direction by overcoming the action of the fixed shading coils.

With such a motor, I use the thermostat 10, which in a preferred embodiment, comprises a base 26 of an insulating material. This base carries a temperature regulating indicator 27, the hub of which is mounted for swinging movement about the longitudinal axis of a stud shaft 28 carried in connection with the base 26, as shown in my prior patent, No. 2,336,387, issued January 2, 1945, the lower end of the indicator being movable with respect to a temperature graduated surface 29. Fixed to the stud shaft 28 is the inner end of a spirally coiled bimetallic element 30, the outer end of said element being free to move in response to variations in adjacent temperatures.

The bimetallic element is connected by a lead 31 extending from the terminal screw 23. Also, the outer end of the bimetallic element is provided with a contact 32 which is adapted to be moved into and out of engagement with a similar contact 33 carried by the movable leg of a U-shaped metallic switch spring 34. This spring has the other or fixed leg thereof clamped between a pair of insulating washers 39 carried in connection with the indicator arm 27. Axially, these washers are provided with an opening in which is fitted a sleeve of insulating material 40, the latter being internally threaded for the reception of a manually adjustable screw 41. The outer end of this screw is provided with a contact 42 which is disposed in registration with a similar contact 43 provided on the movable leg of the spring 34 and in spaced relation from the contact 33 thereof.

The bimetallic element is formed so that when heated, its free end, carrying the contact 32, moves in a counter-clockwise direction and, when the bimetallic element is cooled, its outer or free end turns in a clockwise direction. When the room in which the thermostat is positioned possesses an adequate temperature, at or above a predetermined normal, the free end of the bimetallic element is spaced from the contact 33 of the spring 34, thus allowing for engagement of the contacts 42 and 43, as a result of the inherent resiliency of the spring. With the parts of the thermostat so positioned, the circuit of the wound shading coils 20 is interrupted. However, as the room in which the thermostat is positioned cools, the outer end of the bimetallic element, turning clockwise, strikes the contact 33. At this moment, and before separation of the contacts 42 and 43, a primary circuit is made, current flowing through terminal 23 and conductor 31 to the bimetallic element, passing through contacts 32 and 33 and contacts 42 and 43 to the adjustable screw 41, there being a conductor 45 uniting the screw 41 with the terminal 24, thus completing the primary circuit in which the wound shading coils are positioned. This reverses the operation of the shaded pole motor with respect to that which takes place when the fixed coils 19 are fully effective, causing the opening of the furnace controls actuated thereby. When the area which the thermostat controls has become satisfied with heat, as a result of the opening of the furnace drafts or the like, the bimetallic element moves away from the spring contact 33, thereby interrupting the primary circuit in which the wound shading coils are positioned, causing the direction of the motor to reverse as a result of the excitation of the fixed shading coils, and closing the furnace controls.

The operation thus given is normal with the use of a shaded pole motor and a thermostat of the character set forth. However, assuming that when the thermostat operated to excite the wound shading coils, and thereby caused the opening of the furnace controls, for various reasons, such as the furnace fire having been accidentally extinguished, the opening of the controls did not result in the desired increase in temperature of the heated area, the present invention provides an automatic signal for directing attention to this undesired condition, and which is one which the thermostat and its associated parts cannot correct. Since the opening of the furnace controls did not result in the desired output of heat, because of lack of combustion or the like, the thermostatic element 30 continues to turn in a clockwise direction as its surrounding temperature falls. This continued movement of the free end of the element 30 flexes the movable leg of the spring 34, thereby separating the contacts 42 and 43. When the contacts 42 and 43 are thus spaced a secondary circuit is completed, in which current will flow from the bimetallic element and through the entire length of the spring 34. To the fixed end of the spring, which is clamped between the blocks or washers 39, there is joined a conductor 46 or conductors which leads to the contact base 47 of an incandescent lamp 48. Another conductor 49 extends from the base 47 to the terminal 24. This signal lamp is positioned so that it may be readily seen by the occupants of the dwelling in which the thermostat is arranged, and when the same illuminates, a visual signal is thus made possible, notifying the house occupants at once of the disorder in the heating system. The lamp 48 may be disposed in a relatively remote position with respect to the bimetallic element 30, so that the heat of the lamp does not affect the bimetallic element nor modify its operation, as shown in Fig. 1.

Figure 3:
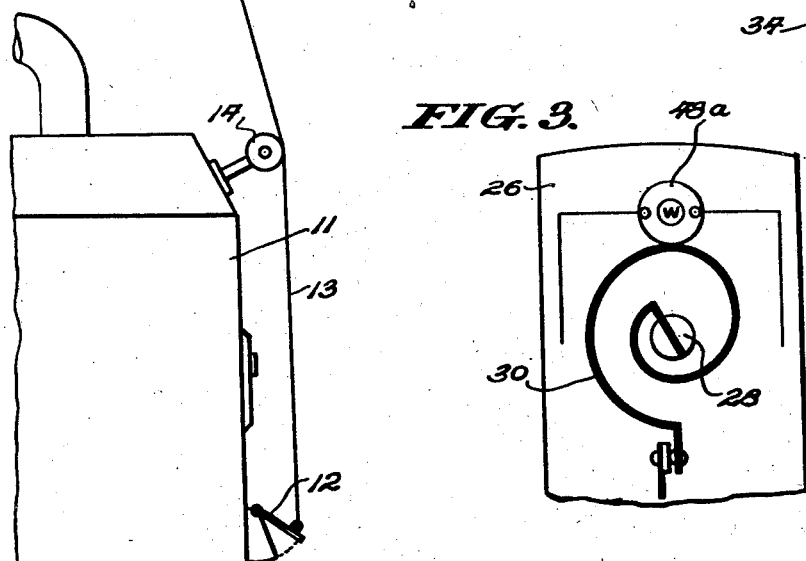
Fig. 3 is a fragmentary front elevational view of a modified form of switch.

However, as shown in Fig. 3, if the lamp is disposed immediately adjacent to the bimetallic element, so that the heat of the lamp is absorbed at least in part by the bimetallic element, an operation is provided in which the lamp 48a will be intermittently energized when in its initial stages of operation, in order that its "flashing" may produce a more effective visual signal than if the lamp were steadily illuminated. This "flashing" is obtained by the fact that the heat of the lamp when applied to the bimetallic element will, at the early stages of illumination of the lamp, cause flexing of the bimetallic element to reestablish engagement between the contacts 42 and 43, providing at the beginning relatively long periods of deenergization of the lamp, which periods will gradually shorten as the general temperature around the bimetallic element decreases until full and sustained energization of the lamp takes place.

While I have described and shown the signal as comprising an incandescent lamp, which is considered to be a preferred form, it will be understood that an audible signal of an electrically energized type may be used in lieu thereof.

It will be noted that the lamp 48 will be in circuit with and energized by current flowing as generated by the shading coils of the motor 17, and, also, that the shading coils, due to the improved power factor of the resistance of the lamp, will be fully effectual, so that the motor will have its full torque to lift the furnace damper 12, or to operate other similar combustion-promoting devices.

In the modified form of my improved thermostatic control, as shown in Fig. 4, the thermostat comprises a dielectric base 50 which supports a stud 51. Mounted on this stud for turning movement about its longitudinal axis is a depending indicator arm 52, the lower end of the latter being movable adjacent a graduated surface 53 denoting temperature. Connected with the stud 51 is the inner end of a bimetallic coil 54, the latter having the same flexing characteristics in response to temperature variations as the coil or element 30 previously described.

The outer movable end of the coil or element 54 carries a contact 55 which is adapted for engagement with a similar contact 56 carried by the outer end of a flexible switch reed 57. This reed has its opposite end secured to an insulating block 58 supported in connection with the lower end of the indicator arm 52. Also carried by the indicator arm is a pair of insulating washers 59 which effect the support of a manually adjustable screw 60. One end of this screw is provided with a manipulating head and at the opposite end thereof is arranged in registration with the contact 56.

On the base 50, there is provided a terminal post 61 adapted for connection with a conductor 62 which may lead to the motor 17, or other electrical device under control, such as a solenoid valve, relay or the like. A conductor 63 extends from the post 61 to the terminal base 64 of a primary signal lamp 65. From the base 64, there extends a second conductor 66 which leads to the fastened end of the reed 57. The base 50 is provided with a second terminal post 67. This post is joined by a conductor 68 with the bimetallic element 54 and by another conductor 69 with the base of a secondary signalling lamp 70. From the base of the lamp 70, a conductor 71 extends to the controlled electrical device. The primary signalling lamp 65 is of the high resistance type, whereas the secondary signalling lamp 70 is of the low resistance type. Preferably, the bulbs of these lamps are of different colors, and while the lamps have been shown in closely assembled relation with the thermostat proper, it is understood that these lamps may be remotely disposed with respect to each other, or with respect to the base of the thermostat, if desired.

In the operation of the mechanism disclosed in Fig. 4, when the room in which the thermostat is positioned possesses a temperature at or above a predetermined normal, the contacts 55 and 56 are separated, so that no current passes through either of the signalling lamps. As the temperature of the room cools, the flexing of the element 54 results in bringing the contacts 55 and 56 together. Under such conditions, a primary circuit is completed, current flowing from the post 61 through conductor 63 to the primary lamp 65, thence from said latter lamp by way of conductor 66 to terminal post 72, through conductor 73 and reed 57 to the contacts 55 and 56; thence through the bimetallic element 54 and through conductors 68 and 69, the secondary signalling lamp 70 and conductor 71. When this circuit is completed, due to differences in the resistance values of the lamps 65 and 70, the primary signal lamp will be energized to produce full illumination, whereas the secondary lamp will not be sufficiently energized to produce an effective visual signal.

If, for any reason, the temperature in the room around the thermostat should continue to decrease even though under normal actuation an increase in temperature should have resulted, the continued deflection of the bimetallic element 54 in a clockwise direction results in flexing the reed 57 to bring its contact 56 into engagement with the inner end of the adjustable screw 60, the temperature necessary for effecting such an engagement being variable through adjustment of the screw 60. When the contacts 55, 56 and 60 are in mutual engagement a secondary circuit is completed and the primary lamp 65 is short circuited, current flowing from the post 61 through conductor 74 to the screw 60, thence through contacts 55 and 56 to the bimetallic element 54, passing from said element through the secondary lamp 70 and returning through conductors 71. Due to the increased current values, produced as a result of the short circuiting of the primary lamp 65, sufficient current travels through the secondary lamp 70 to effect its full energization and illuminating power, notifying the attendants of a disorder in the associated heating or air-conditioning system.

In the apparatus disclosed in Fig. 4, it will be noted that the primary signalling lamp goes off upon a predetermined temperature drop, instead of coming on to indicate too low a temperature, as in the previously described forms of my invention. This arrangement is particularly desirable for a thermostat used, for example, in theaters or other public buildings, since the primary light can be set to operate over any given temperature range, as for example, 4 degrees F. Any spread of, for instance, one-half to 10 degrees F. can be selected by the adjustment of the thumb screw 60.

In this manner, a theater may be equipped with a number of such thermostats (Fig. 4) placed within view of the operator, who could tell at a glance if all parts of a theater building were within the desired temperature limits. The secondary lamp 70 in this arrangement is used to indicate that the temperature is below and not above the desired temperature. Preferably, the secondary lamp is of a different color from the main lamp so that the lamps may be distinguished at a distance. In case the thermostat proper could not be mounted in easy view of an operator, the secondary lamp 70, if remotely disposed, would give the necessary information, as it would glow very dimly at a normal pre-selected temperature, brightly below such temperature, and not at all if above the normal temperature. Such an arrangement is of value for central heating systems, such as those employed in the operation of greenhouses, incubators, brooders and the like. Any suitable power supply, such as a small transformer, may operate the thermostats in case no motor operation is necessitated, as in Fig. 1.

While I have described what I consider to be certain preferred embodiments of my improved signalling thermostat, nevertheless, it will be understood that such embodiments are subject to further variation and modification without departing necessarily from the scope of the appended claims.

I claim:

1. Temperature-controlling and indicating apparatus comprising a base, spaced terminals on said base adapted for connection with conductors forming a circuit in which is located an associated electrically operated heater control unit, a bimetallic element on said base electrically connected with the first of said terminals, said element having the free end movable in response to variations in adjacent temperatures, a resilient U-shaped switch member having a stationary arm and a movable arm, an adjustable contact supported in connection with said base and electrically connected with said second terminal, said contact being normally engaged with the movable arm of said switch member to complete said circuit when said movable arm is engaged by the free end of the bimetallic element, an electrically energized signal, a conductor leading from the fixed arm of said switch member to said signal and from the latter to the second of said terminals, whereby extreme deflection of said bimetallic element produces flexure of the movable arm of said switch member to separate the same from said adjustable contact and thereby divert current flow through said signal.

2. Temperature-controlling apparatus comprising a base, a pivotally movable indicator mounted on said base, a spirally coiled bimetallic element having the inner end thereof joined with said base adjacent the pivotal axis of said indicator, the free end of said element being deflectable in response to temperature variations, a resilient U-shaped switch member having a stationary arm and a movable arm, the fixed arm of said switch member being mounted in connection with said indicator and the movable arm thereof being arranged in the path of movement of the free end of said bimetallic element, an adjustable contact carried by said indicator and normally disposed in engagement with the resilient arm of the switch member, continued cooling of said bimetallic element serving to remove said switch member from circuit-completing engagement with said contact, and a signalling circuit including an electrically energized signalling device, said last-named circuit being completed upon separation of the switch member from said contact.

3. Temperature-controlling and indicating apparatus comprising a base, a stud on said base, a temperature indicator mounted at one end on said stud for pivotal movement in a plane parallel with the base, a spirally coiled bimetallic element having its inner end fixed to said stud, the outer end of said element being free to deflect in response to surrounding temperature variations, a resilient switch arm fixed at one end to said indicator and having its other end disposed for resilient engagement with the outer deflectable end of said bimetallic element, a threadedly adjustable contact member carried by said indicator for engagement with the resiliently movable portion of said switch arm, a main control circuit including a pair of conductors, one of said conductors leading to said bimetallic element and the other to the adjustable contact member, and a supplemental signal-controlling circuit automatically completed when said bimetallic element is abnormally deflected in a circuit-closing direction.

4. Temperature-controlling apparatus comprising a base, a pivotally movable indicator mounted on said base, a spirally coiled bimetallic element having the inner end thereof joined with said base adjacent to the pivotal axis of said indicator, the free end of said element being deflectable in response to temperature variations, a resilient switch arm fixed at one end to said indicator and having its other end disposed in the path of movement of the outer deflectable end of said bimetallic element, an adjustable contact carried by said indicator for circuit-completing engagement with the resiliently movable portion of said switch arm, a main control circuit including a pair of conductors, one of which leads to the bimetallic element and the other to the adjustable contact member, whereby when said bimetallic element is deflected in a circuit-closing direction to initially engage said switch arm said circuit is closed, and a supplemental signal controlling circuit completed when said bimetallic element is abnormally deflected in its circuit-closing direction and following closure of said main circuit.

GEORGE W. CRISE.

REFERENCES CITED

The following references are of record in the file of this patent:

UNITED STATES PATENTS

| Number | Name | Date |
|---|---|---|
| 1,582,872 | McCurdy et al. | Apr. 27, 1926 |
| 1,653,685 | Whittington | Dec. 27, 1927 |
| 1,876,636 | Dicke | Sept. 13, 1932 |
| 1,909,712 | Oppegaard | May 16, 1933 |
| 1,957,343 | Hurxthal et al. | May 1, 1934 |
| 2,092,085 | Riley | Sept. 7, 1937 |
| 2,134,685 | Crise et al. | Nov. 1, 1938 |
| 2,402,312 | Burch | June 18, 1946 |